United States Patent
Ugusa et al.

(10) Patent No.: US 6,411,875 B2
(45) Date of Patent: Jun. 25, 2002

(54) AUTOMATIC DOOR LOCK RELEASING APPARATUS

(75) Inventors: Aki Ugusa; Yukihiro Okimoto, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/791,543

(22) Filed: Feb. 26, 2001

Related U.S. Application Data

(63) Continuation of application No. PCT/JP99/03430, filed on Jun. 25, 1999.

(51) Int. Cl.$^7$ .................................................. G06F 7/00
(52) U.S. Cl. ........................................ 701/36; 701/49
(58) Field of Search .......................... 701/36, 45, 46, 701/47, 49

(56) References Cited

FOREIGN PATENT DOCUMENTS

| | | |
|---|---|---|
| JP | 64-31862 | 2/1989 |
| JP | 6-99787 | 4/1994 |
| JP | 6-234342 | 8/1994 |
| JP | 7-277133 | 10/1995 |
| JP | 8-135273 | 5/1996 |
| JP | 10-185942 | 7/1998 |

Primary Examiner—William A. Cuchlinski, Jr.
Assistant Examiner—Edward Pipala
(74) Attorney, Agent, or Firm—Sughrue Mion, PLLC

(57) ABSTRACT

An automatic door lock releasing apparatus according to the present invention comprises decelerating direction integrating means for integrating a decelerating direction component of each of the acceleration signals obtained from acceleration sensors in a vehicle; accelerating direction integrating means for integrating an accelerating direction component; coefficient means for weighting an output of the accelerating direction integrating means with a specified coefficient; subtracting means for subtracting an output of the coefficient means from an output of the decelerating direction integrating means; an arithmetic processing unit for determining a resultant velocity of velocity signals; and a comparison processing unit for comparing the resultant velocity with a threshold value and generating a start signal.

7 Claims, 10 Drawing Sheets

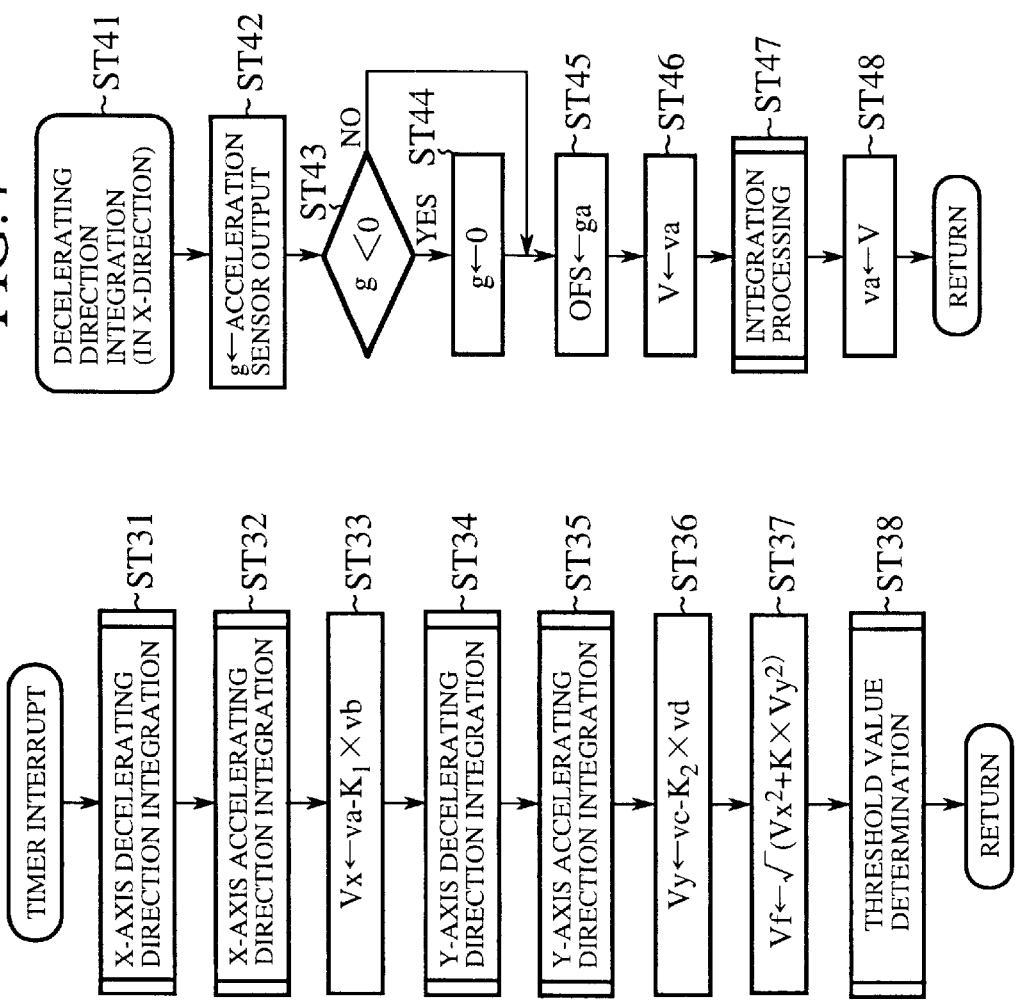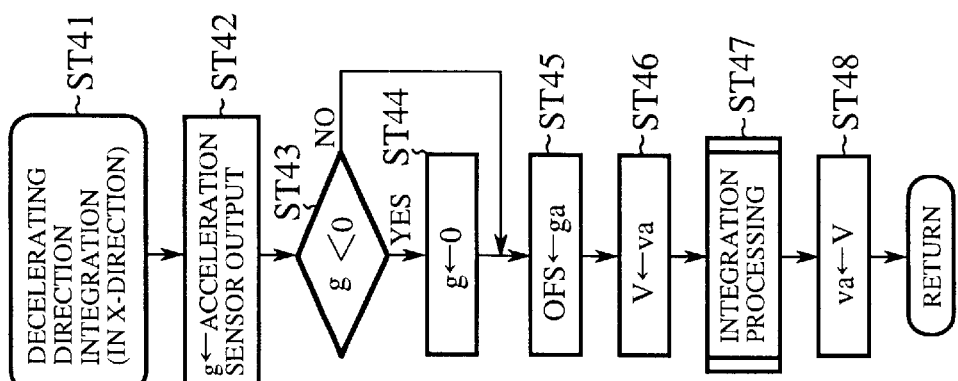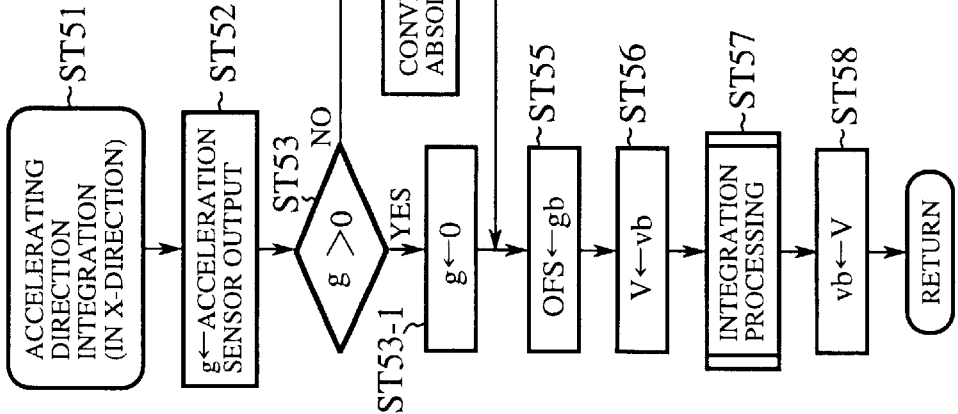

FIG.10
MEDIUM SPEED AND ROUGH ROAD PROCESSING
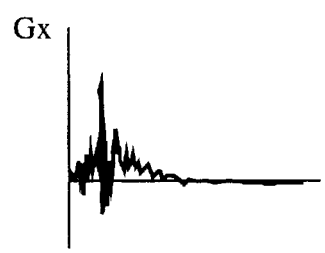
(10A) G SENSOR 1 OUTPUT
WAVEFORM
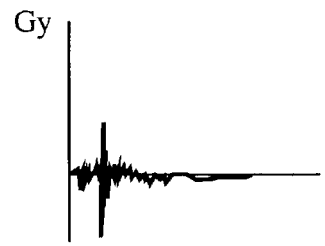
(10B) G SENSOR 11 OUTPUT
WAVEFORM
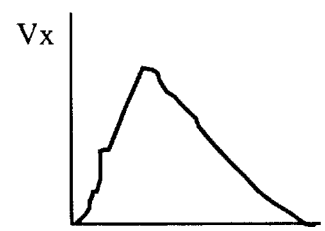
(10C) SUBTRACTION PROCESSING
UNIT 5 OUTPUT WAVEFORM
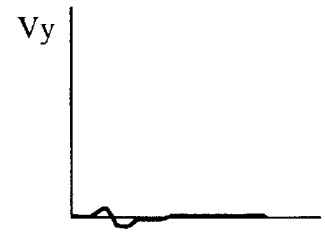
(10D) SUBTRACTION PROCESSING
UNIT 15 OUTPUT WAVEFORM
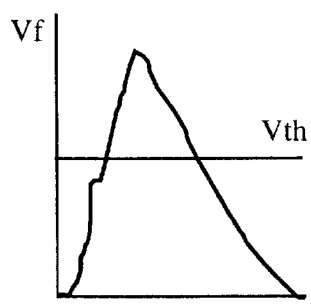
(10E) ARITHMETIC PROCESSING
UNIT 6 OUTPUT WAVEFORM
AND THRESHOLD VALUE
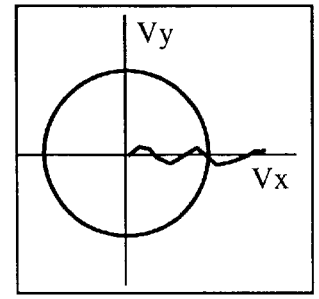
(10F) Vx-Vy
CHARACTERISTIC

FIG.11
MEDIUM SPEED AND ROUGH ROAD PROCESSING
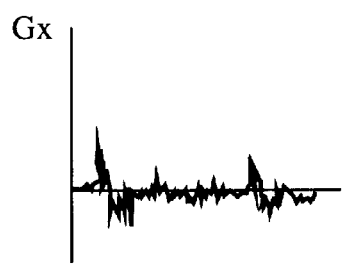
(11A) G SENSOR 1 OUTPUT
WAVEFORM
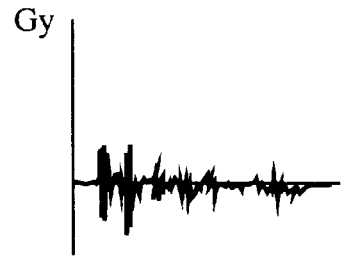
(11B) G SENSOR 11 OUTPUT
WAVEFORM
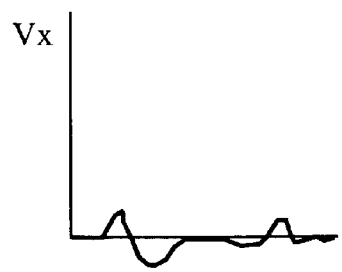
(11C) SUBTRACTION PROCESSING
UNIT 5 OUTPUT WAVEFORM
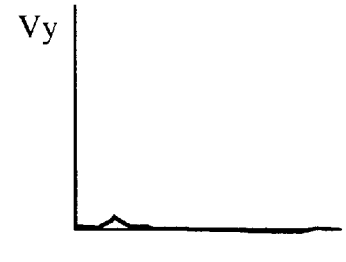
(11D) SUBTRACTION PROCESSING
UNIT 15 OUTPUT WAVEFORM
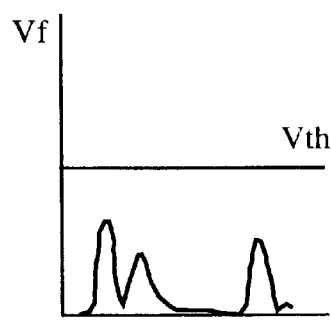
(11E) ARITHMETIC PROCESSING
UNIT 6 OUTPUT WAVEFORM
AND THRESHOLD VALUE
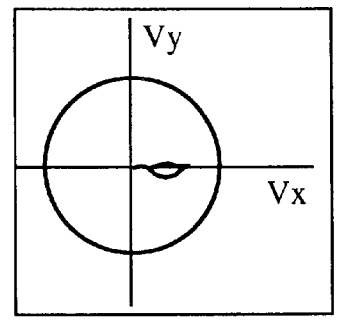
(11F) Vx-Vy
CHARACTERISTIC

AUTOMATIC DOOR LOCK RELEASING APPARATUS

CROSS-REFERENCE TO THE RELATED APPLICATION

This application is a continuation of International Application No. PCT/JP99/03430, whose International filing date is Jun. 25, 1999.

BACKGROUND OF THE INVENTION

1. Field of the Invention

The present invention relates to an automatic door lock releasing apparatus that is automatically started to release a door lock during a collision accident involving a moving object such as a vehicle so that a passenger locked up in the inside is immediately rescued.

2. Description of Related Art

For example, as a conventional automatic door lock releasing apparatus used in a moving object such as a vehicle, there is a door lock releasing apparatus in which an electromechanical sensor, which closes a contact by detecting a collision acceleration during a collision of the vehicle, is used to determine release of a door lock of the vehicle.

In addition, there is a conventional door lock releasing apparatus that determines release of a door lock in such a manner that when the level of an acceleration signal obtained from an electronic acceleration sensor (hereinafter abbreviated as a G sensor) installed in a vehicle exceeds a specified value, the door lock is released.

Furthermore, conventionally, G sensors used exclusively for a passenger protection system that operates a front collision air bag, a side collision air bag, and the like are also installed in a vehicle, in addition to the above-mentioned G sensor that determines release of a door lock. Therefore, a plurality of G sensors exist in a vehicle.

Now, in some cases, a large acceleration occurs at times other than during vehicle collisions for example travel on rough surfaces. Thus, a conventional door lock releasing apparatus has a problem in that when release of a door lock is to be determined by an electromechanical sensor, it is difficult to distinguish between an acceleration occurring during travel on rough surfaces and an acceleration occurring during a collision.

Conventionally, there has also been a problem even in a case where release of a door lock is to be determined on the basis of the level of an acceleration signal obtained from a G sensor, in that if the G sensor is set so as not to function erroneously when a large acceleration occurs at a time of other than a collision, its proper operation for determining release of a door lock is not ensured at a time of a low speed collision.

SUMMARY OF THE INVENTION

The present invention has been made in order to solve the problems as mentioned above. An object of the present invention is to provide an automatic door lock releasing apparatus that determines release of a door lock by distinguishing between non-collision such as travel on rough surfaces and a hard hit on the bottom of a vehicle and an actual vehicle collision in a vehicle accident or the like and thus correctly determining occurrence of a vehicle collision.

An automatic door lock releasing apparatus according to the present invention comprises a plurality of acceleration sensors for detecting acceleration in a plurality of directions; a plurality of decelerating direction integrating means each provided in correspondence with one of the plurality of acceleration sensors for integrating a deceleration signal of an accelerating direction within a specified sampling time, the acceleration signal being included in each of acceleration signals of the plurality of directions obtained from the plurality of acceleration sensors; a plurality of accelerating direction integrating means each provided in correspondence with one of the plurality of acceleration sensors for integrating a signal of an accelerating direction within a specified sampling time, the signal being included in each of acceleration signals of the plurality of directions obtained from the plurality of acceleration sensors; a plurality of first coefficient means each provided in correspondence with one of the plurality of acceleration sensors for weighting an output of the accelerating direction integrating means by multiplying it by a specified coefficient; a plurality of subtracting means each provided in correspondence with one of the plurality of acceleration sensors for determining a velocity signal by subtracting the integral value outputted from the first coefficient means from the integral value outputted from the decelerating direction integrating means; an arithmetic processing means for receiving a plurality of velocity signals outputted from the plurality of subtracting means and then determining a resultant velocity of the plurality of velocity signals; and a signal generating means for comparing the resultant velocity outputted from the arithmetic processing means with a specified threshold value and then generating and outputting a start signal when the resultant velocity exceeds the specified threshold value.

In addition, in an automatic door lock releasing apparatus according to the present invention, the decelerating direction integrating means includes a positive side acceleration detecting means for detecting a positive side acceleration included in the acceleration signals obtained from the plurality of acceleration sensors; and an integration processing unit for integrating an input of the positive side acceleration outputted from the positive side acceleration detecting means and thereby calculating an integral value of the positive side acceleration.

In addition, in an automatic door lock releasing apparatus according to the present invention, the accelerating direction integrating means includes a negative side acceleration detecting means for detecting a negative side acceleration included in the acceleration signals obtained from the plurality of acceleration sensors; and an integration processing unit for integrating an input of the negative side acceleration outputted from the negative side acceleration detecting means and thereby calculating an integral value of the negative side acceleration.

Moreover, in an automatic door lock releasing apparatus according to the present invention, the arithmetic processing means includes a plurality of square processing units each provided in correspondence with one of the plurality of subtracting means for squaring a velocity signal outputted from each of the plurality of subtracting means; a second coefficient means for weighting an output from part of the plurality of square processing units by multiplying it by a specified value; an addition processing unit for adding outputs of the plurality of square processing units and the second coefficient means; and a square root processing unit for determining a square root value of an output of the addition processing unit.

Moreover, in an automatic door lock releasing apparatus according to the present invention, the signal generating means includes a comparator for comparing the resultant velocity outputted from the arithmetic processing unit with a specified threshold value; and a one-shot timer for generating and outputting the start signal according to an output from the comparator.

Furthermore, in an automatic door lock releasing apparatus according to the present invention, part of the plurality of acceleration sensors are acceleration sensors for a passenger protection apparatus; and the automatic door lock releasing apparatus further includes a collision determining means for receiving an input of an acceleration signal outputted from an acceleration sensor for the passenger protection apparatus and outputting a start signal when the acceleration signal exceeds a specified value.

Furthermore, an automatic door lock releasing apparatus according to the present invention further includes a logical sum means for calculating a logical sum of the start signal from the signal generating means and the start signal from the collision determining means.

BRIEF DESCRIPTION OF THE DRAWINGS

FIG. 3 is a flowchart illustrating normal operation of the automatic door lock releasing apparatus of the first embodiment shown in FIGS. 1 and 2;

FIG. 4 is a flowchart illustrating operation in decelerating direction integration processing;

FIG. 5 is a flowchart illustrating operation in accelerating direction integration processing;

FIGS. 10A, 10B, 10C, 10D, 10E, and 10F are diagrams of assistance in explaining a method for collision determination;

FIGS. 11A, 11B, 11C, 11D, 11E, and 11F are diagrams of assistance in explaining waveforms of acceleration signals produced during travel on rough surfaces, which represent a non-collision;

DETAILED DESCRIPTION OF THE PREFERRED EMBODIMENTS

In order to explain the present invention in more detail, the best mode for carrying out the present invention will now be described with reference to the accompanying drawings.

First Embodiment

Figure 1:
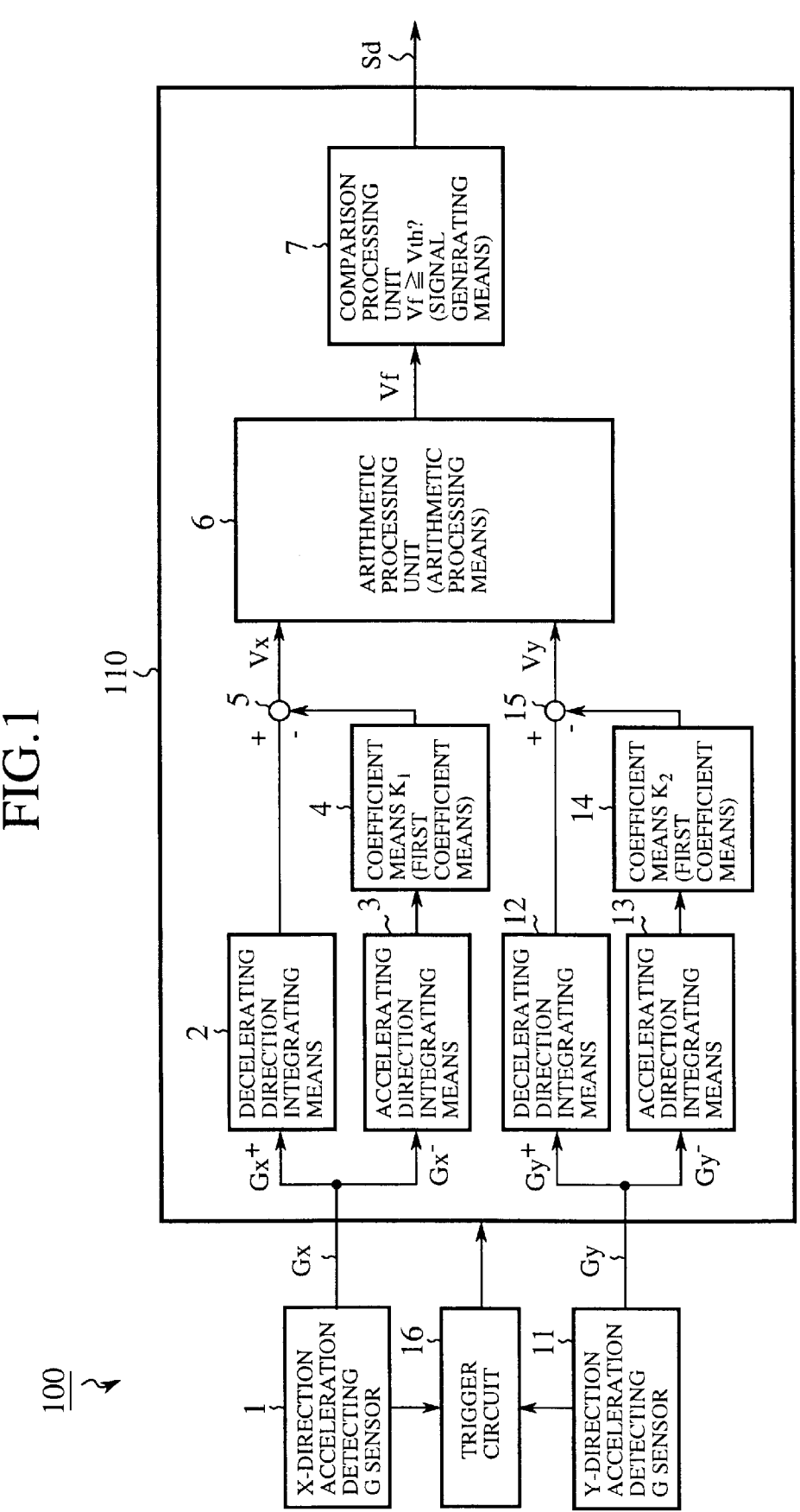
FIG. 1 is a block diagram of an automatic door lock releasing apparatus according to a first embodiment of the present invention.

FIG. 1 is a block diagram of an automatic door lock releasing apparatus 100 according to a first embodiment of the present invention. The automatic door lock releasing apparatus 100 is applied to a vehicle, for example. In the figure, reference numeral 1 denotes an acceleration sensor (G sensor) that detects an X-direction acceleration Gx of a vehicle during a collision. A decelerating direction integrating means 2 integrates a deceleration signal $Gx^+$ of an accelerating direction obtained from the output Gx of the G sensor 1. On the other hand, an accelerating direction integrating means 3 integrates an acceleration signal $Gx^-$ of the accelerating direction obtained from the output Gx of the G sensor 1. Reference numeral 4 denotes a coefficient means (a first coefficient means) that performs weighting by multiplying an output of the accelerating direction integrating means 3 by a coefficient k1. Reference numeral 5 denotes a subtraction processing unit as a subtracting means that subtracts the output of the accelerating direction integrating means 3 weighted by the coefficient means 4 from an output of the decelerating direction integrating means 2. It should be noted that the weighting coefficient k1 is a value set for the vehicle, while the X-direction denotes a direction in which the vehicle is moving, and a Y-direction denotes the lateral direction of the vehicle.

Reference numeral 11 denotes an acceleration sensor (G sensor) that detects an acceleration Gy in a direction different from that of the G sensor 1 (hereinafter referred to as a Y-direction). Reference numeral 12 denotes a decelerating direction integrating means that integrates a deceleration signal $Gy^+$ of an accelerating direction obtained from an output Gy of the G sensor 11. Reference numeral 13 denotes an accelerating direction integrating means that integrates an acceleration signal $Gy^-$ of an accelerating direction obtained from the output Gy of the G sensor 11. Reference numeral 14 denotes a coefficient means (a first coefficient means) that performs weighting by multiplying an output of the accelerating direction integrating means 13 by a given coefficient $k_2$. Reference numeral 15 denotes a subtraction processing unit as a subtracting means that subtracts the output of the accelerating direction integrating means 13 weighted by the coefficient means 14 from an output of the decelerating direction integrating means 12. It should be noted that the weighting coefficient $k_2$ is a value set for the vehicle.

Reference numeral 6 denotes an arithmetic processing unit as an arithmetic processing means that calculates a resultant vector Vf on the basis of an output Vx of the subtraction processing unit 5 and an output Vy of the subtraction processing unit 15. Reference numeral 7 denotes a comparison processing unit as a signal generating means that compares the result of arithmetic processing obtained at the arithmetic processing unit 6 with a preset threshold value Vth. When the result Vf of arithmetic processing outputted from the arithmetic processing unit 6 exceeds the threshold value Vth, for example, the comparison processing unit generates a door lock release signal, and outputs the generated door lock release signal to a door mechanism of the vehicle.

Reference numeral 16 denotes a trigger circuit for inputting X-direction and Y-direction acceleration signals from the G sensors 1 and 11. When the X-direction and Y-direction acceleration signals exceed a specified value, that is, when a change in acceleration occurs at a time of other than the normal operation, the trigger circuit starts respective decelerating direction integrating means 2 and 12, the accelerating direction integrating means 3 and 13, the coefficient means 4 and 14, the arithmetic processing unit 6, and the comparison processing unit 7, which are each shown in FIG. 1.

It should be noted that respective decelerating direction integrating means 2 and 12, the accelerating direction integrating means 3 and 13, the coefficient means 4 and 14, the subtraction processing unit 5, the arithmetic processing unit 6, and the comparison processing unit 7, which are shown in FIG. 1, are realized by microcomputers and logical circuits, for example, and are included in an ECU (Electronic Control Unit) of the vehicle.

Figure 2:
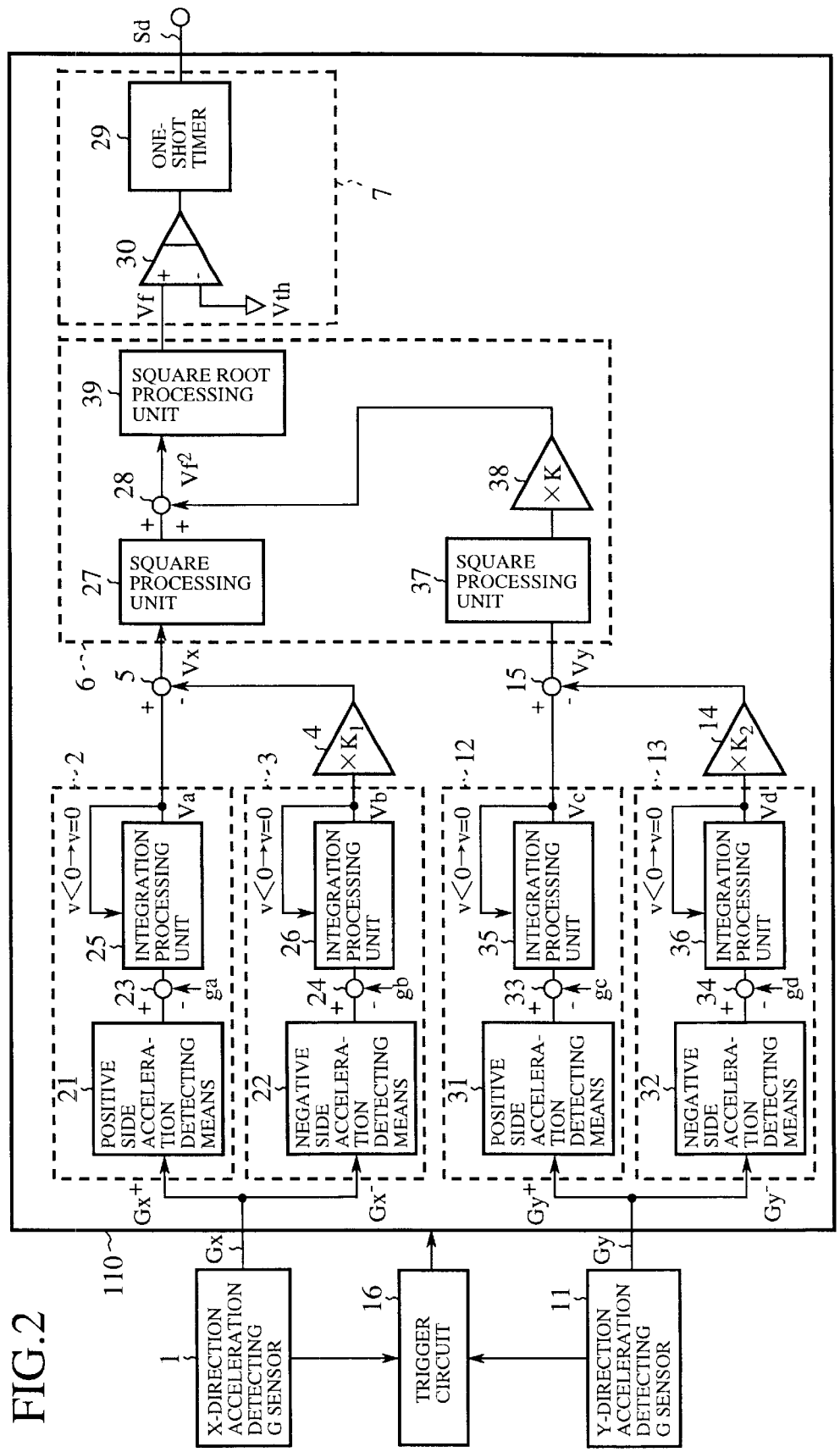
FIG. 2 is a detailed configuration block diagram of the automatic door lock releasing apparatus of the first embodiment shown in FIG. 1.

FIG. 2 is a detailed configuration block diagram showing each component of the automatic door lock releasing apparatus according to the first embodiment as shown in FIG. 1. In the figure, the decelerating direction integrating means 2 and 12 and the accelerating direction integrating means 3 and 13 are provided with positive side acceleration detecting means 21 and 31 and negative side acceleration detecting means 22 and 32, subtraction processing units 23, 24, 33, and 34, and integration processing units 25, 26, 35, and 36, respectively.

The subtraction processing units 23, 24, 33, and 34 subtracts certain acceleration values ga, gb, gc, and gd from accelerations obtained at the positive side acceleration detecting means 21 and 31 and the negative side acceleration detecting means 22 and 32.

The integration processing units 25, 26, 35, and 36 are provided with a function of setting integral values v outputted from the subtraction processing units 23, 24, 33, and 34 to an initial value of 0 when the integral values v are lower than a value 0 (hereinafter abbreviated as a reset function).

In addition, the arithmetic processing unit 6 is an arithmetic unit for determining a resultant vector of X-direction and Y-direction integral values Vx and Vy. The arithmetic processing unit 6 is provided with square processing units 27 and 37, a coefficient means 38 (a second coefficient means) for weighting a velocity vy in the Y-direction, an addition processing unit 28 for adding an output of the square processing unit 27 and an output from the coefficient means 38, and a square root processing unit 39 for extracting the square root of an output from the addition processing unit 28.

The comparison processing unit 7 comprises a comparator that compares a preset threshold value Vth with a resultant vector Vf obtained at the arithmetic processing unit 6, and a one-shot timer 29 that generates and outputs a door lock release signal when the resultant vector value Vf is higher than the threshold value Vth. It should be noted that the threshold value Vth is a value inherent to the vehicle.

Next, the operation of the apparatus will be described.

FIG. 3 is a flowchart describing normal operation of the automatic door lock releasing apparatus for a vehicle according to the first embodiment as shown in FIGS. 1 and 2. The flowchart illustrates processing performed in response to a timer interrupt at certain time intervals.

In the timer interrupt processing, the decelerating direction integrating means 2 determines a decelerating direction integral value va in the X-axis direction at a step ST31, and the accelerating direction integrating means 3 determines an accelerating direction integral value vb in the X-axis direction at a step ST32.

Next, at a step ST33, a value obtained after the coefficient means 4 multiplied the accelerating direction integral value vb by a preset constant k, is subtracted from the decelerating direction integral value va by the subtraction processing unit 5. The obtained subtraction value is set to be Vx.

Next, at a step ST34, the decelerating direction integrating means 12 determines a decelerating direction integral value vc in the Y-axis direction, and at a step ST34, the accelerating direction integrating means 13 determines an accelerating direction integral value vd in the Y-axis direction.

At a step ST36, a value obtained after the coefficient means 14 multiplied the accelerating direction integral value vd by a preset constant $k_2$ is subtracted from the decelerating direction integral value vc by the subtraction processing unit 15. The obtained subtraction value is set to be Vy.

At a step ST37, a resultant vector Vf is determined from Vx obtained at the step ST33 and Vy obtained at the step ST36 multiplied by a preset constant K.

At a step ST38, the comparison processing unit 7 compares the resultant vector Vf with a preset threshold value Vth. If the resultant vector Vf exceeds the predetermined value, the one-shot timer 29 generates a door lock release signal, and thereby the timer interrupt is ended.

FIG. 4 is a flowchart illustrating operation of the decelerating direction integrating means 2 and 12 in decelerating direction integration processing.

Hereinafter, decelerating direction integration will be described by using decelerating direction integration processing for an X-direction acceleration Gx as an example; however, decelerating direction integration processing for a Y-direction acceleration Gy is performed in the same manner.

At a step ST42, an X-direction acceleration signal obtained from the acceleration sensor 1 that detects an X-direction acceleration Gx of the vehicle is set to be a variable g. Next, at a step ST43, when an inputted X-direction acceleration signal g is smaller than 0, the flow of the processing proceeds to a step ST44.

At a step ST44, the X-direction acceleration signal g is set to be 0, and then the flow of the processing proceeds to a step ST45.

When it is determined at the step ST43 that the X-direction acceleration signal g is greater than 0, on the other hand, the flow of the processing proceeds to the step ST45.

At the step ST45, an offset ga is set to be an offset variable OFS. Next, at a step ST46, an integral value va is set to be an integral value V.

At a step ST47, integration processing is performed. At a step ST48, the integral value V is set to be an integral value va, and thereby the decelerating direction integration processing is ended.

FIG. 5 is a flowchart illustrating operation of the accelerating direction integrating means 3 and 13 in accelerating direction integration processing for an X-direction acceleration and a Y-direction acceleration.

Incidentally, since the operation of the accelerating direction integrating means 13 in accelerating direction integration processing for a Y-direction acceleration is performed in the same manner, accelerating direction integration will be described below by using accelerating direction integration processing for an X-direction acceleration as an example.

At a step ST52, an output Gx⁻ from the X-direction acceleration sensor 1 is set to be g.

At a step ST53, when an inputted acceleration signal g is greater than 0, the flow of the processing proceeds to a step ST53-1. At the step ST53-1, the acceleration signal g is set to be 0, and then the processing proceeds to a step ST55.

When it is determined at the step ST53 that the inputted acceleration signal g is smaller than 0, on the other hand, the flow of the processing proceeds to a step ST54.

At a step ST55, an offset gb is set to be an offset OFS. At a step ST56, an integral value vb-is set to be an integral value V. At a step ST57, integration processing is performed by the integration processing unit 26.

Next, at a step ST58, the integral value V is set to be an integral value vb, and thereby the decelerating direction integration processing for an X-direction acceleration is ended.

Figure 6:
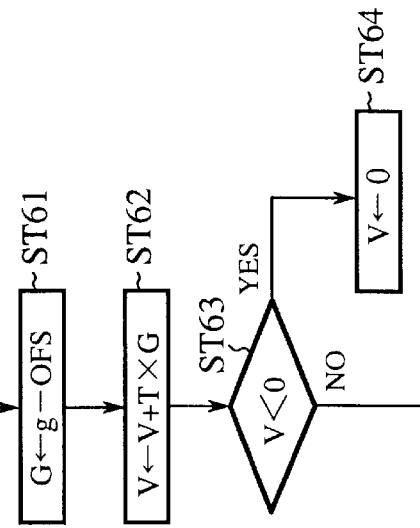
FIG. 6 is a flowchart illustrating operation in integration processing.

FIG. 6 is a flowchart illustrating operation of the integration processing units 25, 26, 35, and 36 in the integration processing illustrated at the step ST47 in FIG. 4 and at the step ST57 in FIG. 5.

Since the operation of the integration processing units 25, 26, 35, and 36 in integration processing is the same, description will be made below by using the operation of the integration processing units 25 and 26 in integration processing for an X-direction acceleration Gx as an example.

First, at a step ST61, a result of subtraction of the offset value OFS set at the step ST45 shown in FIG. 4 or at the step ST55 shown in FIG. 5 from the acceleration signal g is set to be an acceleration signal G.

Then, at a step ST62, the integral value V set at the step ST46 shown in FIG. 4 or at the step ST56 shown in FIG. 5 is added to a product of sampling time T of the acceleration signal multiplied by the acceleration signal G.

Next, at a step ST63, when the integral value V is lower than 0, the flow of the processing proceeds to a step ST64, where the integral value V is reset to 0.

On the other hand, at the step ST63, when the integral value V is higher than 0, the flow of the processing proceeds to the step ST48 in FIG. 4 or the step ST58 in FIG. 5.

Figure 7:
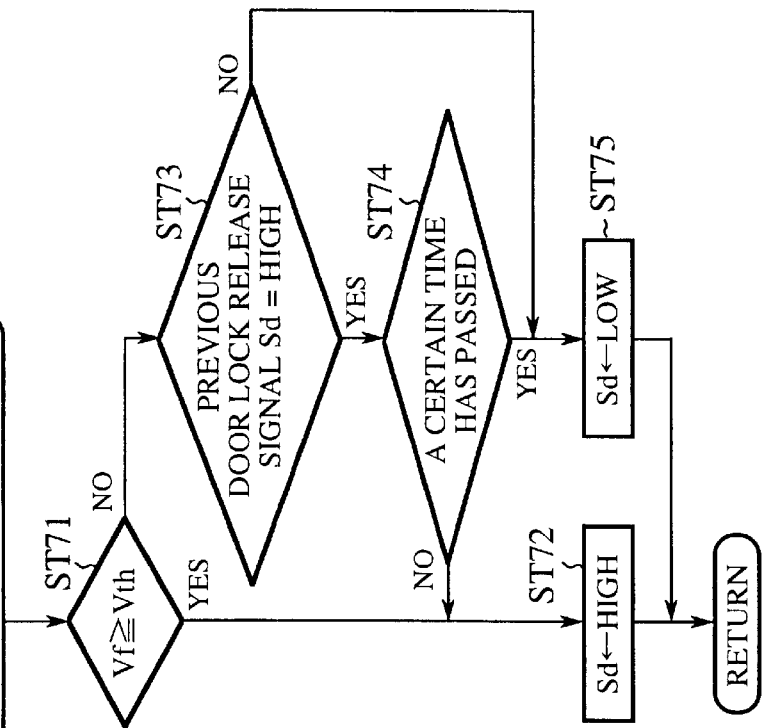
FIG. 7 is a flowchart illustrating operation in threshold value determination processing.

FIG. 7 is a flowchart illustrating operation of the comparison processing unit 7 in threshold value determination processing at the step ST38 shown in FIG. 3.

First, at a step ST71, a result of comparison by the comparator 30 is provided. When an integral value Vf is lower than the threshold value Vth, the flow of the processing proceeds to a step ST73. If a previous door lock release signal Sd is at a high level at the step ST73, it means that the falling edge of the door lock release signal Sd has been detected, and thus the flow of the processing proceeds to a step ST74.

At the step ST74, when a certain time has passed since the falling of the door lock release signal Sd, the flow of the processing proceeds to a step ST75, where the door lock release signal Sd is set to an L level.

On the other hand, when a certain time has not passed since the rising of the door lock release signal Sd at the step ST74, or when the integral value Vf is higher than the threshold value Vth at the step ST71, the flow of the processing proceeds to a step ST72, where the door lock release signal Sd is set to an H level.

FIGS. 8A, 8B, 8C, and 8D are diagrams of assistance in explaining acceleration signals to be compared with one another that are obtained during vehicle collision and during non-collision. FIGS. 8A and 8B show acceleration signals of a front-to-rear direction acceleration Gx and a side-to-side direction acceleration Gy of a vehicle, the signals being produced during medium speed and low speed collisions, at which a door lock should be released. FIGS. 8C and 8D show acceleration signals produced during non-collision such as that of a hard hit at the bottom of a vehicle or that of travel on rough surfaces, at which a door lock should not be released.

Hereinafter, acceleration signals produced during collision and during non-collision will be compared with one another.

Figure 8:
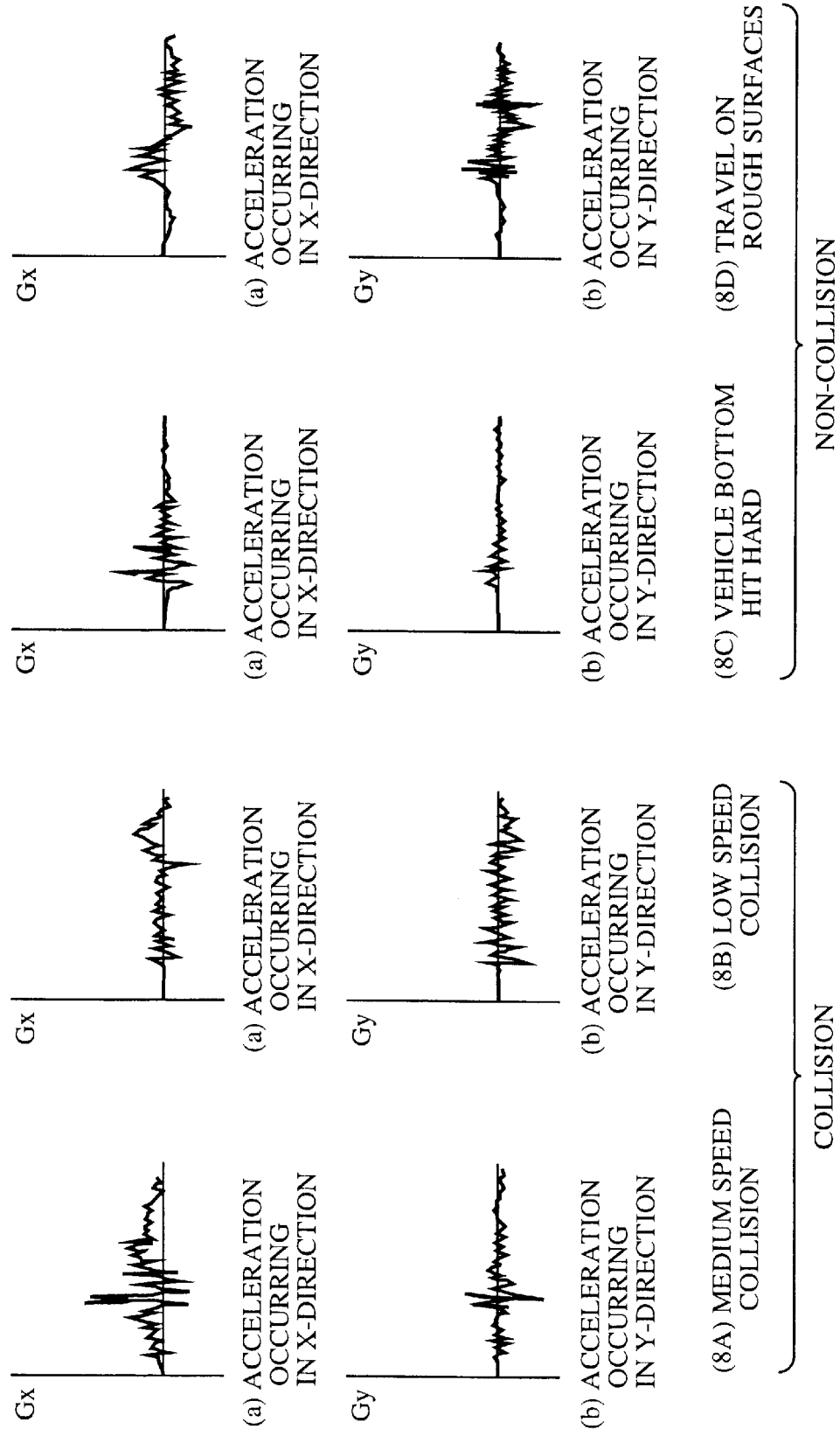
FIGS. 8A, 8B, 8C, and 8D are diagrams of assistance in explaining comparison of acceleration signals produced during collision and during non-collision.

In FIG. 8, the peak value of an (a) X-direction acceleration signal produced during a hard hit at the bottom of a vehicle as shown in FIG. 8C is lower than the peak value of an (a) X-direction acceleration signal produced during a medium speed collision as shown in FIG. 8A. However, it is higher than the peak value of an (a) X-direction acceleration signal produced during a low speed collision as shown in FIG. 8B.

As mentioned above, the peak value of an acceleration signal produced during a non-collision can be higher than the peak value of an acceleration signal produced during a collision, and therefore distinguishing between collision and non-collision by only acceleration peak values may result in a misjudgment; that is to say, it is extremely difficult to judge. Hence, it is not possible to determine whether the door lock releasing apparatus should be activated or not and thereby generate a door lock release signal by using peak values of acceleration signals.

FIGS. 9A, 9B, 9C, and 9D are diagrams of assistance in explaining comparison of root-mean-square values of acceleration signals produced during collision and non-collision of a vehicle. The values shown in FIGS. 9A, 9B, 9C, and 9D are obtained by squaring and then adding the respective accelerations Gx and Gy shown in FIGS. 8A, 8B, 8C, and 8D.

Figure 9:
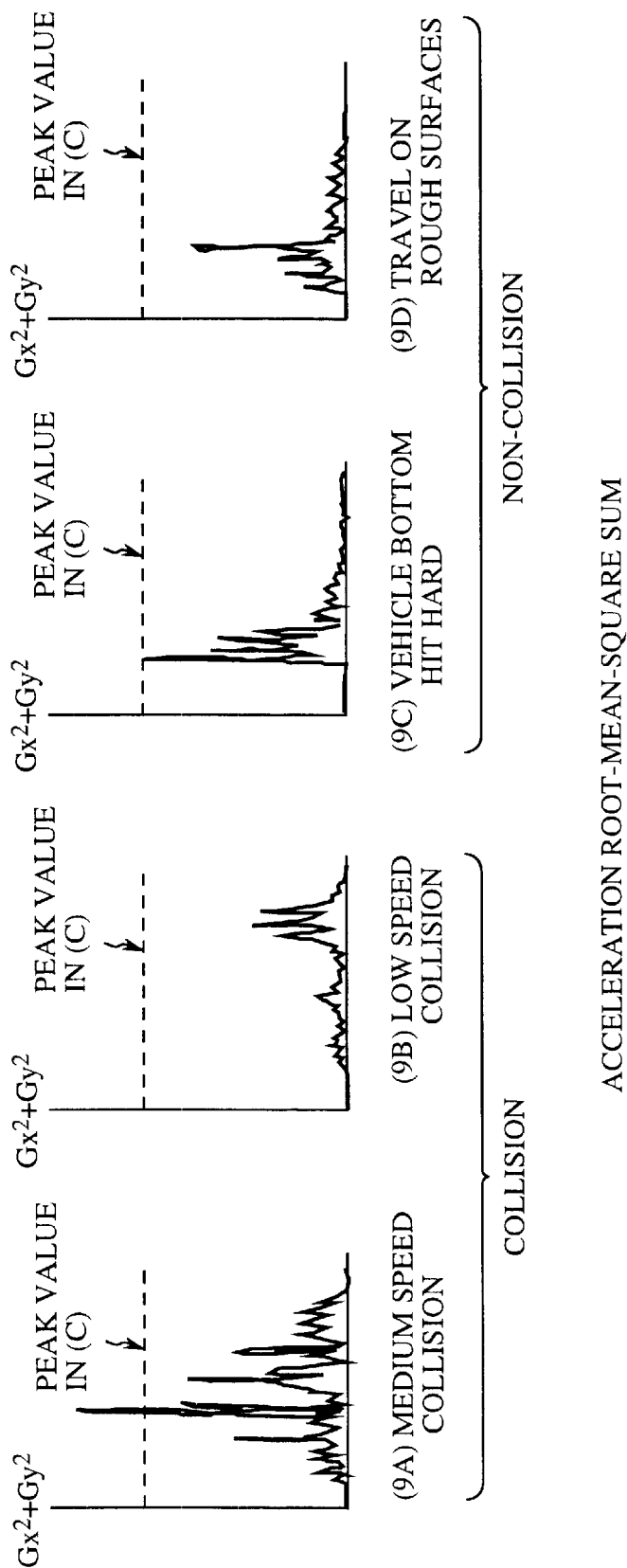
FIGS. 9A, 9B, 9C, and 9D are diagrams of assistance in explaining comparison of root-mean-square values of acceleration signals produced during collision and during non-collision.

In FIG. 9, the maximum value of an arithmetic result for a hard hit at the bottom of a vehicle as shown in FIG. 9C is compared with arithmetic results obtained from the conditions of a medium collision, a low speed collision, and travel on rough surfaces as shown in FIGS. 9A, 9B, and 9D respectively. As shown in FIG. 9, it is understood that even in judgement using sums of root-mean-square values of acceleration signals, it is difficult, as in the example shown in FIG. 8, to prevent an erroneous function of the door lock releasing apparatus during non-collision, and allow a door lock releasing system to judge correctly to activate the door lock releasing apparatus during collision.

FIGS. 10A, 10B, 10C, 10D, 10E, and 10F are diagrams of assistance in explaining a method for collision judgement employed in the automatic door lock releasing apparatus for a vehicle according to the present invention. FIGS. 10A, 10B, 10C, 10D, 10E, and 10F show signal waveforms outputted from parts of the automatic door lock releasing apparatus for a vehicle shown in FIG. 2 during a medium speed collision. FIG. 10A shows an output waveform of the G sensor 1.

FIG. 10B shows an output waveform of the G sensor 11.

FIG. 10C shows an output waveform Vx of the subtraction processing unit 5. The output waveform Vx is obtained when the coefficient means 4 multiplies an integration output waveform integrated at the integration processing unit 26 by a preset coefficient $k_1$, and then an output waveform obtained by the multiplication is subtracted from an integration output waveform integrated at the integration processing unit 25.

FIG. 10D shows an output waveform Vy of the subtraction processing unit 15. The output waveform Vx is obtained when an integration output waveform integrated by the integration processing unit 36 is multiplied by a preset coefficient $k_2$ at the coefficient means 14, and then a resulting output waveform is subtracted from an integration output waveform integrated by the integration processing unit 35.

FIG. 10E shows a comparison between an output waveform Vf of the arithmetic processing unit 6 and a threshold value Vth.

FIG. 10F shows the output waveform Vx of the subtraction processing unit 5 and the output waveform Vy of the subtraction processing unit 15, in which the locus of Vy is compared with the threshold value Vf. When the locus exceeds the threshold value of a circle, a door lock release signal Sd is outputted.

FIGS. 11A, 11B, 11C, 11D, 11E, and 11F are diagrams of assistance in explaining waveforms of acceleration signals produced during travel on rough surfaces, which represent a non-collision.

As in FIG. 10A, FIG. 11A shows an output waveform Gx of the G sensor 1.

FIG. 11B shows an output waveform Gy of the G sensor 11.

FIG. 11C shows an output waveform Vx of the subtraction processing unit 5.

FIG. 11D shows an output waveform Vy of the subtraction processing unit 15.

FIG. 11E shows a comparison between an output waveform Vf of the arithmetic processing unit 6 and the threshold value Vth.

FIG. 11F shows the output waveform Vx of the subtraction processing unit 5 and the output waveform Vy of the subtraction processing unit 15, in which the locus of Vx and Vy is compared with the threshold value Vf.

An acceleration signal produced during non-collision, such as that of travel on rough surfaces, hammering that results in a shock to the ECU itself, or a hard hit at the bottom of a vehicle, provides an output of a high-level acceleration signal of an accelerating direction as compared with normal collision. In addition, the acceleration signal during non-collision is characterized by alternate swings of its acceleration signal of a decelerating direction and its acceleration signal of an accelerating direction. However, the level of the acceleration signal of an accelerating direction is not necessarily equal to that of the acceleration signal of a decelerating direction.

Therefore, in the automatic door lock releasing apparatus according to the present invention, an integration waveform of an acceleration signal of an accelerating direction weighted by being multiplied by a coefficient is subtracted from an integration waveform obtained by integrating an acceleration signal of a decelerating direction, so that an integration waveform when the level of the acceleration signal of an accelerating direction is high is made small. Thus, a clear distinction between collision and non-collision is made.

FIGS. 12A, 12B, 12C, and 12D are diagrams of assistance in explaining a waveform of each of the acceleration signals produced in the automatic door lock releasing apparatus of the first embodiment during collision of the vehicle. FIGS. 12A, 12B, 12C, and 12D show output waveforms Vf of the arithmetic processing unit 6 in the conditions of medium speed collision, low speed collision, a hard hit at the bottom of the vehicle, and travel on rough surfaces, respectively.

Figure 12:
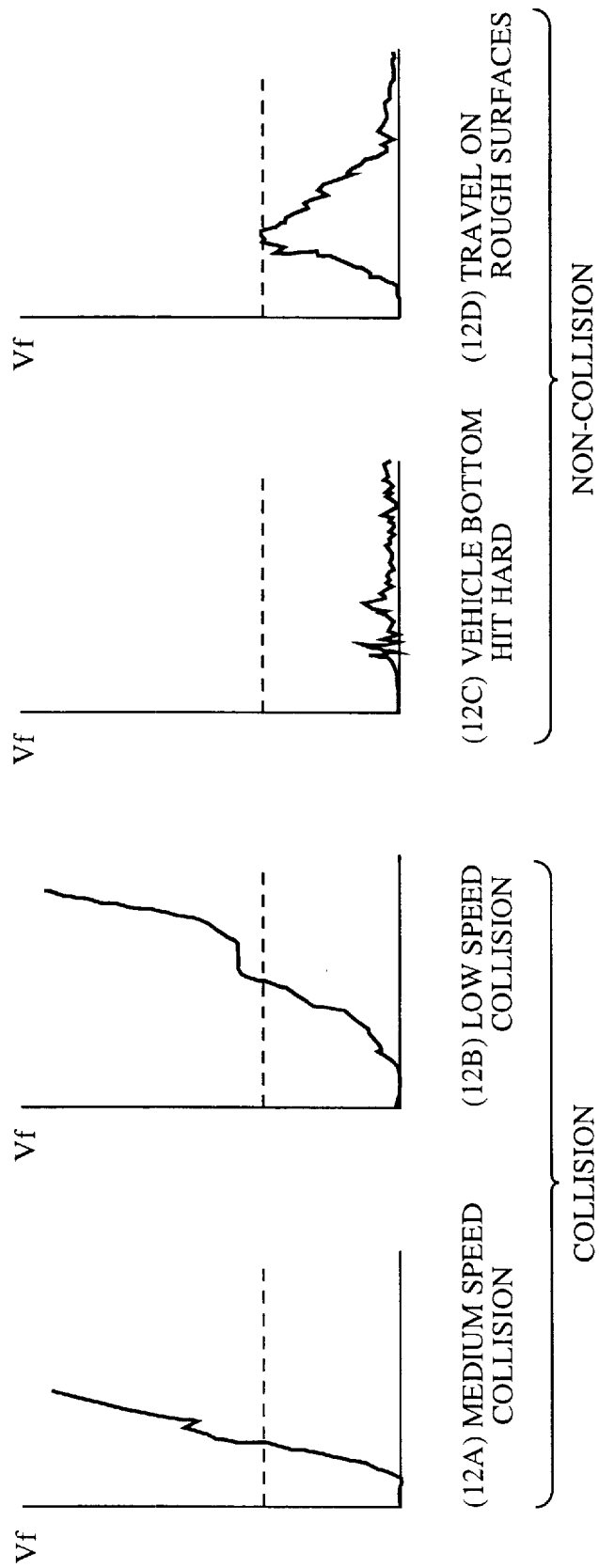
FIGS. 12A, 12B, 12C, and 12D are diagrams of assistance in explaining a waveform of each acceleration signal produced in the automatic door lock releasing apparatus of the first embodiment during collision of a vehicle.

In FIG. 12, the maximum values of the output waveforms Vf of the arithmetic processing unit 6 obtained during a hard hit at the bottom of the vehicle and travel on rough surfaces are compared with the output waveforms Vf of the arithmetic processing unit 6 produced during a medium speed collision and a low speed collision. As is clearly shown in FIG. 12, clear distinction between collision and non-collision can be made.

Thus, with the automatic door lock releasing apparatus according to the present invention, it is possible to prevent malfunction of the automatic door lock releasing apparatus for a vehicle during non-collision and activate a door lock releasing system correctly during collision.

Moreover, because of the difference between the stiffness of a vehicle in the X-direction (a direction in which the vehicle is moving) and its stiffness in the Y-direction (the side-to-side direction), acceleration signal outputs of the X-direction and the Y-direction in response to the same impact may differ greatly from each other. However, since the coefficient K shown in FIG. 2 used for the coefficient means 38 to weight a velocity Vy in the Y-direction is constant independently of the type of vehicle, it plays a role as a parameter that makes it possible to determine whether or not to automatically release the door lock of the vehicle with good responsibility even during a side collision and oblique collision.

It should be noted that although the above description has been limited to the two acceleration sensors in the X-direction, in which the vehicle is moving, and in the Y-direction, that is, the lateral direction of the vehicle, the present invention is not limited to this. Thus, if necessary, an acceleration sensor that detects an acceleration in a specified direction may be provided so that a door lock release signal can be generated by making a correct distinction between collision and non-collision.

It should also be noted that although the above description has been made with respect to an automatic door lock releasing apparatus to be included in a vehicle, the present invention is not limited to this. The present invention can also be applied to an apparatus that is required to release a door lock automatically.

As described above, according to the automatic door lock releasing apparatus for a vehicle in accordance with the first embodiment, a plurality of acceleration signals are obtained from sensors detecting accelerations in a plurality of directions. Then an integration waveform of an acceleration signal of an accelerating direction weighted by being multiplied by a coefficient is subtracted from an integration waveform obtained by integrating one of the above acceleration signals of a decelerating direction, so that an integration waveform when the level of the acceleration signal of an accelerating direction is high is made small. Also a resultant vector is calculated so that an automatic door lock release signal is generated by clearly distinguishing between collision and non-collision. Therefore, it is possible to determine types of collisions in all directions on the basis of acceleration signals and thereby correctly generate a door lock release signal. Thus, it is possible to prevent malfunction in the processing for door lock release judgement, and also to quickly perform collision judgement.

Second Embodiment

Figure 13:
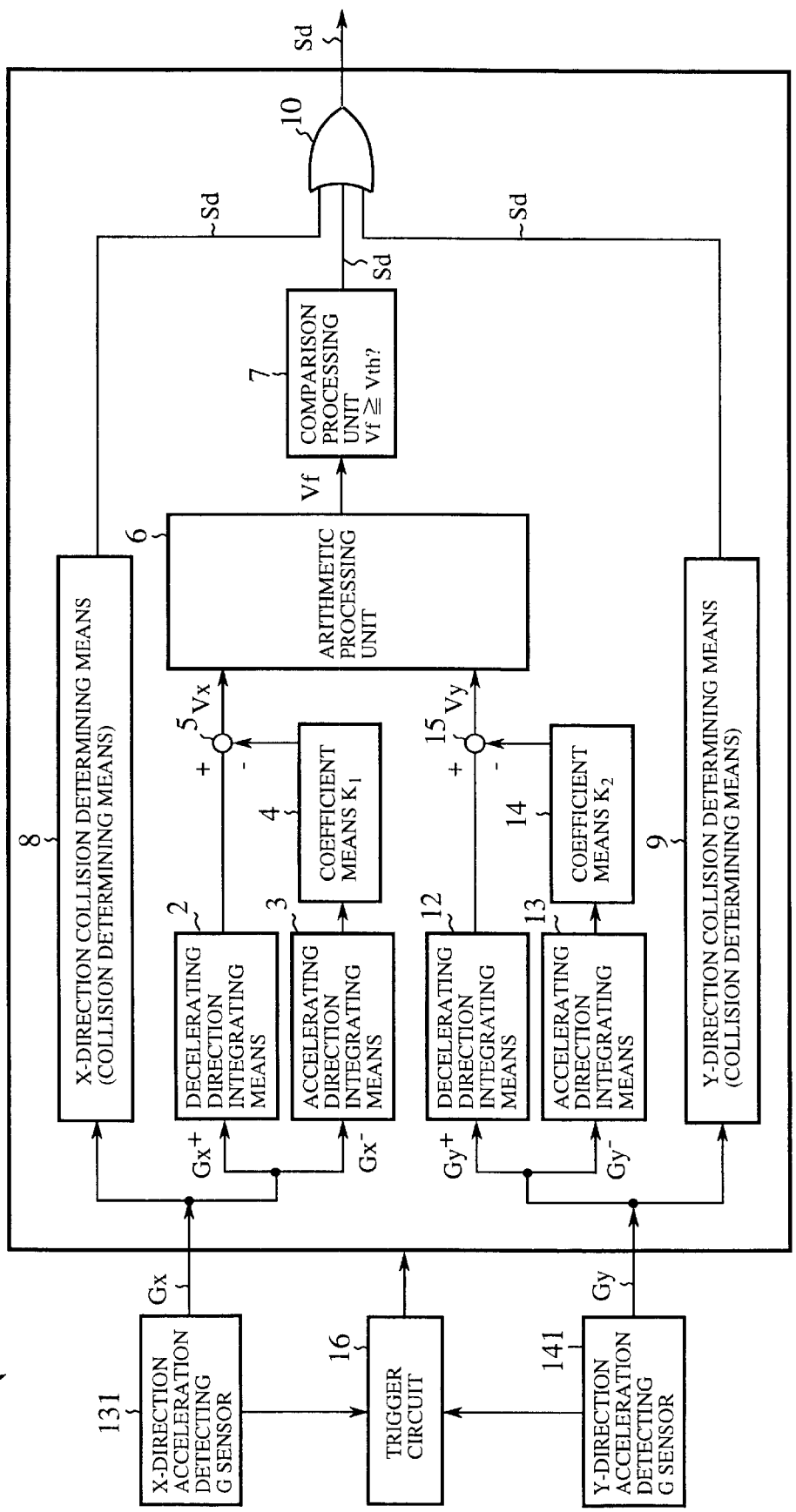
FIG. 13 is a block diagram of an automatic door lock releasing apparatus according to a second embodiment of the present invention.

FIG. 13 is a block diagram of an automatic door lock releasing apparatus according to a second embodiment of the present invention. In the figure, reference numeral 131 denotes an X-direction acceleration detecting G sensor. The acceleration sensor is provided for use in a passenger protection apparatus such as an air bag, for example. Reference numeral 8 denotes an X-direction collision determining means (a collision determining means). The X-direction collision determining means is supplied with an acceleration signal from the X-direction acceleration detecting G sensor 131, and accordingly generates a door lock release signal under the same conditions as in generation of a signal for activating a passenger protection apparatus during head-on collision of the vehicle.

Reference numeral 141 denotes a Y-direction acceleration detecting G sensor, which also serves as an acceleration sensor provided for use in a passenger protection apparatus such as an air bag, for example.

Reference numeral 9 denotes a Y-direction collision determining means. The Y-direction collision determining means is supplied with an acceleration signal from the Y-direction acceleration detecting G sensor 141, and accordingly generates a door lock release signal under the same conditions as in generation of a signal for activating a passenger protection apparatus during head-on collision of the vehicle.

Reference numeral 10 denotes a logical sum means. The logical sum means 10 is supplied with door lock release signals from the X-direction collision determining means 8, the comparison processing unit 7, and the Y-direction collision determining means 9, accordingly calculates a logical sum on the basis of the above, and then outputs a door lock release signal resulting from the calculation to the outside.

It is noted that the other components are the same as those of the first embodiment. Therefore, the same reference numerals are used for corresponding components, and further description will be omitted here.

Next, the operation of the apparatus will be described.

The X-direction collision determining means 8 is supplied with an acceleration signal obtained from the X-direction acceleration detecting G sensor 131, determines, activation of the passenger protection apparatus such as an air bag during head-on collision of the vehicle, and generates an activation signal. Thus, when an acceleration in the X-direction that is at a sufficient level to activate the passenger protection apparatus is supplied from the X-direction acceleration detecting G sensor 131, the X-direction collision determining means 8 generates a door lock release signal Sd, and then outputs it to the logical sum means 10.

Similarly, the Y-direction collision determining means 9 is supplied with an acceleration signal obtained from the Y-direction acceleration detecting G sensor 141, determines activation of the passenger protection apparatus such as an air bag during head-on collision of the vehicle, and generates an activation signal. Thus, when an acceleration in the Y-direction that is at a sufficient level to activate the passenger protection apparatus is supplied from the Y-direction acceleration detecting G sensor 141, the Y-direction collision determining means 9 generates a door lock release signal Sd, and then outputs it to the logical sum means 10.

The logical sum means 10 calculates a logical sum of output signals from the X-direction collision determining means 8 and the Y-direction collision determining means 9 and an output signal outputted from the comparison processing unit 7 described in the first embodiment, and then outputs a door lock release signal Sd to the outside.

In determination of whether or not to output a door lock release signal to start the passenger protection apparatus in the automatic door lock releasing apparatus for a vehicle according to the second embodiment, it is difficult to determine collisions in all directions as compared with the first embodiment. However, since G sensors for a passenger protection apparatus are also used for the second embodiment, it is possible to more quickly determine a collision to be detected in a specific direction.

As described above, the second embodiment is configured in such a way that G sensors for a passenger protection apparatus are also used for the second embodiment, and a means for determining output of a signal to start the passenger protection apparatus is added in order to generate a door lock release signal. Thus, in addition to the effect of the first embodiment, the second embodiment has an effect of enabling simple configuration of the apparatus.

As described above, the automatic door lock releasing apparatus according to the present invention makes it possible to determine types of collisions in all directions on the basis of acceleration signals; that is, it is possible to generate an automatic door lock release signal by making correct determination during collision and during non-collision. Thus, the automatic door lock releasing apparatus makes it possible to prevent an erroneous function in processing for door lock release determination, and hence it is applicable to transportation vehicles and other fields as a highly reliable apparatus that determines the occurrence of a collision quickly.

What is claimed is:

1. An automatic door lock releasing apparatus comprising:
    a plurality of acceleration sensors for detecting acceleration in a plurality of directions;
    a plurality of decelerating direction integrating means each provided in correspondence with one of said plurality of acceleration sensors for integrating a deceleration signal of an accelerating direction within a specified sampling time, said acceleration signal being included in each of acceleration signals of the plurality of directions obtained from said plurality of acceleration sensors;
    a plurality of accelerating direction integrating means each provided in correspondence with one of said plurality of acceleration sensors for integrating a signal of an accelerating direction within a specified sampling time, said signal being included in each of acceleration signals of said plurality of directions obtained from said plurality of acceleration sensors;
    a plurality of first coefficient means each provided in correspondence with one of said plurality of acceleration sensors for weighting an output of said accelerating direction integrating means by multiplying it by a specified coefficient;
    a plurality of subtracting means each provided in correspondence with one of said plurality of acceleration sensors for determining a velocity signal by subtracting said integral value outputted from said first coefficient means from said integral value outputted from said decelerating direction integrating means;
    an arithmetic processing means for receiving a plurality of velocity signals outputted from said plurality of subtracting means and determining a resultant velocity of said plurality of velocity signals; and
    a signal generating means for comparing said resultant velocity outputted from said arithmetic processing means with a specified threshold value and generating and outputting a start signal when said resultant velocity exceeds said specified threshold value.

2. An automatic door lock releasing apparatus as claimed in claim 1,
    wherein the decelerating direction integrating means includes:
        a positive side acceleration detecting means for detecting a positive side acceleration included in the acceleration signals obtained from the plurality of acceleration sensors; and
        an integration processing unit for integrating an input of said positive side acceleration outputted from said positive side acceleration detecting means and thereby calculating an integral value of said positive side acceleration.

3. An automatic door lock releasing apparatus as claimed in claim 1,
    wherein the accelerating direction integrating means includes:
        a negative side acceleration detecting means for detecting a negative side acceleration included in the acceleration signals obtained from the plurality of acceleration sensors; and
        an integration processing unit for integrating an input of said negative side acceleration outputted from said negative side acceleration detecting means and thereby calculating an integral value of said negative side acceleration.

4. An automatic door lock releasing apparatus as claimed in claim 1,
wherein the arithmetic door lock processing means includes:
plurality of square processing units each provided in correspondence with one of the plurality of subtracting means for squaring a velocity signal outputted from each of said plurality of subtracting means;
a second coefficient means for weighting an output from part of said plurality of square processing units by multiplying it by a specified value;
an addition processing unit for adding outputs of said plurality of square processing units and said second coefficient means; and
a square root processing unit f or determining a square root value of an output of said addition processing unit.

5. An automatic door lock releasing apparatus as claimed in claim 1,
wherein the signal generating means includes:
a comparator for comparing the resultant velocity outputted from the arithmetic processing unit with a specified threshold value; and
a one-shot timer for generating and outputting said start signal according to an output from said comparator.

6. An automatic door Lock releasing apparatus as claimed in claim 1,
wherein part of the plurality of acceleration sensors are acceleration sensors for a passenger protection apparatus; and
wherein the automatic door lock releasing apparatus further includes a collision determining means for receiving an input of an acceleration signal outputted from an acceleration sensor for said passenger protection apparatus and outputting a start signal when said acceleration signal exceeds a specified value.

7. An automatic door lock releasing apparatus as claimed in claim 6, further including a logical sum means for calculating a logical sum of the start signal from the signal generating means and said start signal from the collision determining means.

* * * * *